United States Patent
Kim et al.

(10) Patent No.: US 11,586,923 B2
(45) Date of Patent: Feb. 21, 2023

(54) NEURAL NETWORK LEARNING METHOD AND DEVICE

(71) Applicants: SAMSUNG ELECTRONICS CO., LTD., Suwon-si (KR); KOREA ADVANCED INSTITUTE OF SCIENCE AND TECHNOLOGY, Daejeon (KR)

(72) Inventors: Jun-mo Kim, Daejeon (KR); Ye-gang Lee, Daejeon (KR); Byung-ju Kim, Daejeon (KR); Si-haeng Lee, Daejeon (KR); Min-seok Park, Daejeon (KR); Pyung-whan Ahn, Daejeon (KR); Jae-young Lee, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 366 days.

(21) Appl. No.: 16/645,158

(22) PCT Filed: Sep. 6, 2018

(86) PCT No.: PCT/KR2018/010421
§ 371 (c)(1),
(2) Date: Mar. 6, 2020

(87) PCT Pub. No.: WO2019/050297
PCT Pub. Date: Mar. 14, 2019

(65) Prior Publication Data
US 2020/0285965 A1    Sep. 10, 2020

(30) Foreign Application Priority Data
Sep. 8, 2017    (KR) .......................... 10-2017-0115464

(51) Int. Cl.
| | | |
|---|---|---|
| *G06N 3/08* | (2006.01) | |
| *G06N 3/04* | (2006.01) | |
| *G06N 3/082* | (2023.01) | |

(52) U.S. Cl.
CPC ............... *G06N 3/082* (2013.01); *G06N 3/04* (2013.01)

(58) Field of Classification Search
CPC .......... G06N 3/082; G06N 3/04; G06N 3/063; G06N 3/006; G06N 3/08
See application file for complete search history.

(56) References Cited

U.S. PATENT DOCUMENTS

| | | |
|---|---|---|
| 2008/0027925 A1 | 1/2008 | Li et al. |
| 2016/0117587 A1 | 4/2016 | Yan et al. |

(Continued)

FOREIGN PATENT DOCUMENTS

| | | |
|---|---|---|
| KR | 10-2015-0054258 | 5/2015 |
| KR | 10-2016-0072768 | 6/2016 |

(Continued)

OTHER PUBLICATIONS

K. Orimo, et al., "FPGA architecture for feed-forward sequential memory network targeting long-term time-series forecasting," 2016 International Conference on ReConFigurable Computing and FPGAs (ReConFig), 2016, pp. 1-6, doi: 10.1109/ReConFig.2016.7857169 (Year: 2016).*

(Continued)

*Primary Examiner* — Matthew Mikels
(74) *Attorney, Agent, or Firm* — Nixon & Vanderhye, P.C.

(57) ABSTRACT

The disclosure relates to an artificial intelligence (AI) system for mimicking functions, such as cognition and determination as of the human brain, by utilizing a machine learning algorithm such as deep learning, and an application (Continued)

thereof. Provided are a neural network learning method according to an AI system and applications thereof, the method including extracting, by using a masking filter having an effective value in a specific portion of the masking filter including weight information of at least one hidden layer included in a learning network model, characteristics of input data according to weight information of a filter corresponding to the specific portion, comparing output data with target data, the output data being obtained from the learning network model based on extracted characteristics of the input data, and updating a size of the specific portion having the effective value in the masking filter, based on a result of the comparing.

9 Claims, 6 Drawing Sheets

(56) References Cited

U.S. PATENT DOCUMENTS

| | | |
|---|---|---|
| 2016/0275415 A1 | 9/2016 | Yoo et al. |
| 2016/0322042 A1 | 11/2016 | Vlietinck et al. |
| 2019/0279052 A1 | 9/2019 | Han et al. |

FOREIGN PATENT DOCUMENTS

| | | |
|---|---|---|
| KR | 10-2017-0023708 | 3/2017 |
| WO | 2015/016640 | 2/2015 |

OTHER PUBLICATIONS

Glorot, Xavier, et al., "Understanding the Difficulty of Training Deep Feedforward Neural Networks," Proceedings of the Thirteenth International Conference on Artificial Intelligence and Statistics, 2010, pp. 249-256.

International Search Report dated Dec. 27, 2018 in counterpart International Patent Application No. PCT/KR2018/010421 and English-language machine translation.

Written Opinion dated Dec. 27, 2018 in counterpart International Patent Application No. PCT/KR2018/010421 and English-language machine translation.

Park, Je-Kang, et al. "Method of Recognizing Object in Image Using Deep Learning," Journal of ICROS 21(4), Dec. 2015, pp. 21-26 (6 pages) and English-language translation.

Office Action dated Aug. 26, 2022 in Korean Patent Application No. 10-2017-0115464 and partial English-language translation.

* cited by examiner

| (-2,-2) | (-2,-1) | (-2,0) | (-2,1) | (-2,2) |
|---|---|---|---|---|
| (-1,-2) | (-1,-1) | (-1,0) | (-1,1) | (-1,2) |
| (0,-2) | (0,-1) | (0,0) | (0,1) | (0,2) |
| (1,-2) | (1,-1) | (1,0) | (1,1) | (1,2) |
| (2,-2) | (2,-1) | (2,0) | (2,1) | (2,2) |

NEURAL NETWORK LEARNING METHOD AND DEVICE

This application is the U.S. national phase of International Application No. PCT/KR2018/010421 filed Sep. 6, 2018 which designated the U.S. and claims priority to KR Patent Application No. 10-2017-0115464 filed Sep. 8, 2017, the entire contents of each of which are hereby incorporated by reference.

BACKGROUND

Field

The present disclosure relates to a neural network learning method, a neural network learning apparatus, and a recording medium having recorded thereon a program for executing the neural network learning method.

Description of Related Art

An artificial intelligence (AI) system is a computer system that implements human-level intelligence. Unlike existing rule-based smart systems, AI is a system in which machines learn, judge and become smart. The more the AI system is used, the more the recognition rate of the AI system may improve and the AI system may more accurately understand user preferences, and thus, existing rule-based smart systems are gradually being replaced with deep-learning-based AI systems.

AI technology consists of machine learning (deep learning) and element technologies that utilize machine learning.

Machine learning is an algorithm technology that classifies/learns the characteristics of input data autonomously. Element technology is a technology that simulates functions of the human brain such as recognition and judgment by using machine learning algorithms such as deep learning, and consists of technical fields such as linguistic understanding, visual comprehension, reasoning/prediction, knowledge representation, and motion control.

The various fields in which AI technology is applied are as follows. Linguistic understanding is a technology for recognizing, applying, and processing human language/characters, and includes natural language processing, machine translation, dialogue system, query response, speech recognition/synthesis, and the like. Visual comprehension is a technology for recognizing and processing objects as done with human vision, and includes object recognition, object tracking, image search, human recognition, scene understanding, spatial understanding, image enhancement, etc. Reasoning/prediction is a technology for judging and logically inferring and predicting information, and includes knowledge/probability based reasoning, optimization prediction, preference base planning, and recommendation. Knowledge representation is a technology for automating human experience information into knowledge data, and includes knowledge building (data generation/classification) and knowledge management (data utilization). Motion control is a technology for controlling autonomous travelling of a vehicle and motion of a robot, and includes motion control (navigation, collision avoidance, traveling), operation control (behavior control), etc.

SUMMARY

Provided are a neural network learning method, apparatus, and recording medium, capable of improving performance of a learning network model by dynamically changing a size of a portion in a filter of at least one hidden layer configuring the learning network model that is used to extract characteristics of input data.

Also, provided are a neural network learning method, apparatus, and recording medium, capable of improving performance of a learning network model by dynamically changing the number of channels configuring the learning network model.

The disclosure relates to an artificial intelligence (AI) system for mimicking functions such as cognition and determination of the human brain by utilizing a machine learning algorithm such as deep learning, and an application thereof. In particular, the disclosure relates to a neural network learning method according to an artificial intelligence (AI) system and applications thereof, the neural network learning method including extracting, by using a masking filter having an effective value in a specific portion of the masking filter including weight information of at least one hidden layer included in a learning network model, characteristics of input data according to weight information of a filter corresponding to the specific portion, comparing output data with target data, the output data being obtained from the learning network model based on extracted characteristics of the input data, and updating a size of the specific portion having the effective value in the masking filter, based on a result of comparison.

DETAILED DESCRIPTION

According to an aspect of the disclosure, a neural network learning method includes extracting, by using a masking filter having an effective value in a specific portion from the filter consisting of weight information of at least one hidden layer included in a learning network model, characteristics of input data according to weight information of a filter corresponding to the specific portion, comparing output data with target data, the output data being obtained from the learning network model based on extracted characteristics of the input data, and updating a size of the specific portion having the effective value in the masking filter, based on a result of comparison.

The updating of the size of the specific portion having the effective value in the masking filter may be repeatedly performed until a difference between the output data and the target data is less than a threshold value set in advance, based on a gradient descent technique.

Information about the difference between the output data and the target data comprises a function having the size of the specific portion in the filter as a variable, the information being obtained as the result of comparison.

The size of the specific portion of the filter may be determined according to a distance from a center of the masking filter.

The extracting of the characteristics of the input data may include extracting the characteristics of the input data by using the masking filter from a filter consisting of weight information of at least one hidden layer in each of certain number of channels that are included in the learning network model, and the updating of the size may include updating the number of the channels and the size of the specific portion having the effective value in the masking filter with respect to each of the certain number of channels, based on the result of comparison.

According to an aspect of the disclosure, a neural network learning apparatus includes a memory storing one or more instructions, and at least one processor configured to execute the one or more instructions stored in the memory, wherein the at least one processor is further configured to extract, by using a masking filter having an effective value in a specific portion from the filter consisting of weight information of at least one hidden layer included in a learning network model, characteristics of input data according to weight information of a filter corresponding to the specific portion, compare output data with target data, the output data being obtained from the learning network model based on extracted characteristics of the input data, and update a size of the specific portion having the effective value in the masking filter, based on a result of comparison.

The terminology used herein will be described briefly, and the present disclosure will be described in detail.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

It will be understood that although the terms "first" and "second" are used herein to describe various elements, these elements should not be limited by these terms. Terms are only used to distinguish one element from other elements. For example, a second element may be referred to as a first element while not departing from the scope of the present disclosure, and likewise, a first element may also be referred to as a second element. The term and/or includes a combination of a plurality of related described items or any one item among the plurality of related described items.

It will be further understood that the terms "comprises" and/or "comprising," when used in this specification, specify the presence of stated components, but do not preclude the presence or addition of one or more components. The term "unit", as used herein, means a software or hardware component, such as a Field Programmable Gate Array (FPGA) or Application Specific Integrated Circuit (ASIC), which performs certain tasks. However, the term "unit" is not limited to software or hardware. A "unit" may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and "units" may be combined into fewer components and "units" or may be further separated into additional components and "units".

Hereinafter, one or more embodiments of the disclosure will be described in detail with reference to accompanying drawings to the extent that one of ordinary skill in the art would be able to carry out the disclosure. However, the disclosure may be implemented in various manners, and is not limited to one or more embodiments described herein. In addition, components irrelevant with the description are omitted in the drawings for clear description, and like reference numerals are used for similar components throughout the entire specification.

Figure 1:
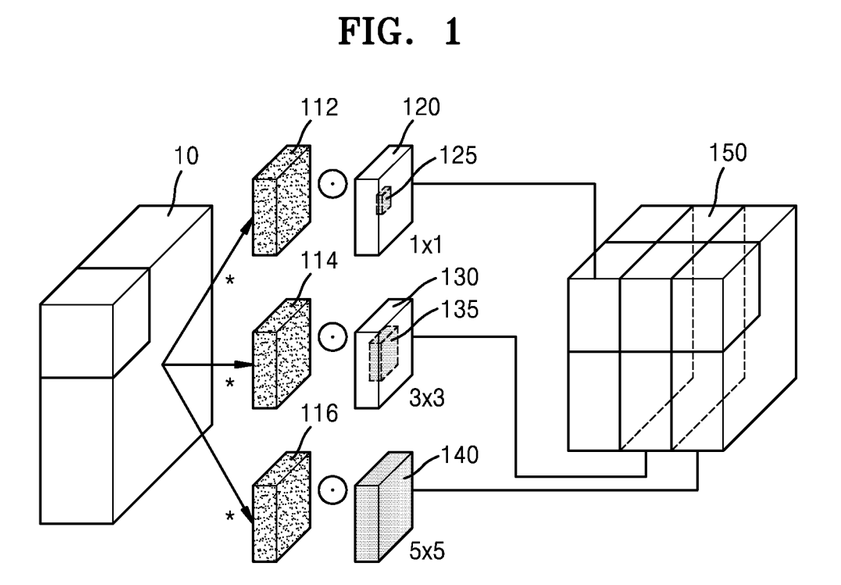
FIG. 1 is a conceptual diagram illustrating a neural network learning method according to an embodiment.

FIG. 1 is a conceptual diagram illustrating a neural network learning method according to an embodiment.

Referring to FIG. 1, a neural network learning apparatus may include a learning network model including an input layer, at least one hidden layer, and an output layer. The hidden layer may include a filter (for example, 112) including pieces of weight information for extracting characteristics from input data. Also, the hidden layer may include a plurality of channels. For example, the plurality of channels may include a red (R) channel, a green (G) channel, a blue (B) channel, and other channels generated as a result of combining the stated channels. However, the disclosure is not limited thereto, that is, the hidden layer may include only one channel. Also, each of the channels included in the hidden layer may include filters 112, 114, and 116.

The neural network learning apparatus according to the embodiment may adjust a size of the filter (e.g., 112) by applying a masking filter (e.g., 120) having an effective value to a specific portion (e.g., 125) in the filter 112 included in the hidden layer.

For example, the neural network learning apparatus may apply the masking filter 120 having an effective value in the portion 125 having a size of 1×1 in the first filter 112 having a plurality of weighed values. Here, the first filter 112 has a size of 5×5 and it is assumed that portions other than the portion 125 having the size of 1×1 in the masking filter 120 have a value of 0. The effective value denotes a value rather than 0.

In addition, as the masking filter 120 is applied to the first filter 112, a weighed value of a portion in the first filter 112, wherein the portion corresponds to the certain portion 125 having the effective value of the masking filter 120, may be used to extract characteristics from the input data.

Also, the neural network learning apparatus applies a masking filter 130 having an effective value in a portion 135 having a size of 3×3 to the second filter 114 as described above, and thus, only a weighed value of a portion in the second filter 114, wherein the portion corresponds to the certain portion 135 having the effective value in the masking filter 130, may be used to extract the characteristics from the input data.

The neural network learning apparatus applies a masking filter 140 having an effective value in a portion 145 having a size of 5×5 to the third filter 116 as described above, and thus, only a weighed value of a portion in the third filter 116, wherein the portion corresponds to the certain portion 145 having the effective value in the masking filter 140, may be used to extract the characteristics from the input data.

The neural network learning apparatus may train a learning network model by outputting characteristic 150 of the input data, the characteristic 150 is extracted through the plurality of filters 112, 114, and 116 and the plurality of masking filters 120, 130, and 140, or applying the characteristic 150 as an input to another hidden layer.

In addition, in order to improve accuracy of output data obtained from the neural network learning apparatus, a size of the filter for extracting the characteristic of the input data needs to be adjusted. The neural network learning apparatus according to the embodiment may have an effect of adjusting the size of the filter by adjusting the portion (e.g., 125) having the effective value in the masking filter (e.g., 120) as described above.

Also, the accuracy of the output data may be determined based on information about a difference between target data to be obtained from the input data and the output data output from the learning network model. The neural network learning apparatus according to the embodiment may determine an optimal size capable of reducing the difference between the target data and the output data, by generating the information about the difference between the target data and the output data in the format of a function that has the size of the portion (e.g., 125) having the effective value in the masking filter (e.g., 120) as a variable. The neural network learning apparatus may use a gradient descent method in order to determine an optimal inclination of the portion (e.g., 125) having the effective value in the masking filter (e.g., 120).

Also, the neural network learning apparatus may represent the size of the portion (e.g., 125) having the effective value in the masking filter (e.g., 120) as a distance from a center of the masking filter 120, in order to apply the gradient descent method. When the size of the portion (e.g., 125) having the effective value is represented as the distance from the center of the masking filter (e.g., 120), the information about the difference between the target data and the output data may be obtained in the format of a function having the distance, that is, continuous data, as a variable.

Figure 2:
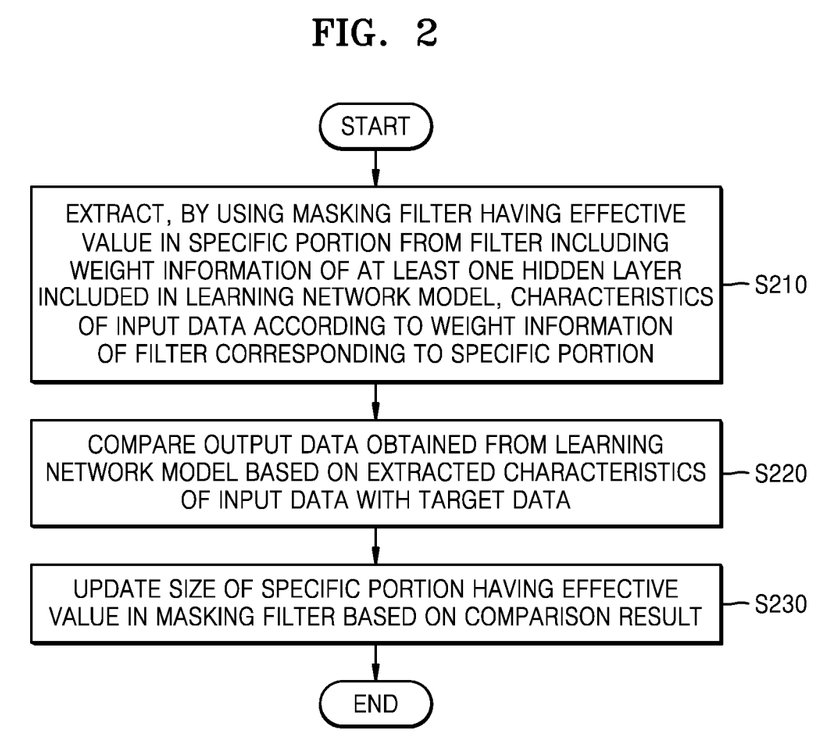
FIG. 2 is a flowchart illustrating a neural network learning method according to an embodiment.

FIG. 2 is a flowchart illustrating a neural network learning method according to an embodiment.

In operation S210, the neural network learning apparatus, by using a masking filter having an effective value in a specific portion, may extract characteristics of input data according to weight information of the filter corresponding to the specific portion, from the filter including weight information of at least one hidden layer included in a learning network model.

The learning network model according to the embodiment is a trained model based on a neural network, and may include an input layer, at least one hidden layer, and an output layer. The hidden layer may include a filter including a weighed value for extracting at least one characteristic from input data.

Also, the at least one hidden layer may exist for each channel in the learning network. Here, the channel may include, for example, an R channel, a G channel, and a B channel.

In addition, for example, when the input data is an image, the characteristic of the input data may include color, edge, polygon, saturation, brightness, color temperature, blur, sharpness, contrast, etc. in the input image, but the characteristic of the input image is not limited thereto.

In operation S220, the neural network learning apparatus may compare output data obtained from the learning network model with the target data, based on the extracted characteristic of the input data.

The neural network learning apparatus according to the embodiment may obtain information about the difference between the output data and the target data as a loss function. Here, the loss function may be expressed as a function regarding a number of a channel and size of a filter allocated to layer for each channel included in the learning network. Also, the size of the filter denotes a size of a portion having an effective value in a masking filter.

In operation S230, the neural network learning apparatus may update the size of a specific portion having the effective value in the masking filter, based on a result of comparing the output data with the target data.

The neural network learning apparatus according to the embodiment may determine at least one of the number of channels, by which a value of the obtained loss function is reduced, and the size of the portion having the effective value in the masking filter, based on the result of comparing the output data with the target data. Here, the gradient descent method may be one of ways of reducing the value of the loss function. Also, the loss function may correspond to, for example, a mathematical expression for making a probability for the output data to coincide with the target data 1 and making the other probabilities close to 0.

In order to use the gradient descent method, the variable of the loss function have to be continuous variable. In addition, the sizes of portions having effective values in the masking filter may be, for example, 1×1, 3×3, etc., that is, may not be continuous, and thus the neural network learning apparatus may convert the size of the portion having the effective value in the masking filter into a distance. This will be described in detail below with reference to FIG. 3.

Also, the neural network learning apparatus may also update the weighed value of the filter, as well as the size of the specific portion having the effective value in the masking filter, so as to reduce the difference between the output data and the target data. Here, the neural network learning apparatus may set a condition for the weighed value of the filter so that the difference between the output data and the target data may be converged, in order to optimize the size of the certain portion having the effective value in the masking filter. The condition for the weighed value of the filter may be expressed by equation 1 and equation 2 below, with respect to each of forward propagation and backward propagation.

$$\text{Var}[\mathbf{w}^\ell] = 1/(\mathbf{k}^\ell)^2 c_{in} \quad \text{[Equation 1]}$$

$$\text{Var}[\mathbf{w}^\ell] = 1/(\mathbf{k}^\ell)^2 c_{out} \quad \text{[Equation 2]}$$

In equation 1 above, $\mathbf{w}^\ell$ denotes a weighed value, $\mathbf{k}^\ell$ denotes a variable about the size of the specific portion having the effective value, $c_{in}$ denotes the number of channels in the forward propagation, and $c_{out}$ denotes the number of channels in the backward propagation.

Also, the neural network learning apparatus may adjust the weighed value by multiplying the weighed value by $1/k^\ell$, that is, a rescaling factor about the size of the specific portion having the effective value, and, $1/\sqrt{c_{in}}$, that is, a rescaling factor about the number of channels, in order to prevent a variance of the weighed value from being changed according to the dynamic change in the weighed value for each layer. The forward propagation and the backward propagation taking into account the rescaling factor may be expressed respectively by equation 3 and equation 4 below.

$$y^\ell = \left[\left(\frac{1}{k^\ell}\right) * \left(1/\sqrt{c_{in}^\ell}\right) * W_k^\ell\right] * x^\ell + b^\ell \quad \text{[Equation 3]}$$

$$y^\ell = \left[\left(\frac{1}{k^\ell}\right) * \left(1/\sqrt{c_{out}^\ell}\right) * W_k^\ell\right] * x^\ell + b^\ell \quad \text{[Equation 4]}$$

In equation 3 above, $x^\ell$ denotes an input vector of a layer $\ell$, $y^\ell$ denotes an output vector of the layer $\ell$, $b^\ell$ denotes a bias vector of the layer $\ell$, $W_k^\ell$ denotes a weight matrix of the layer $\ell$, $k^\ell$ denotes a filter size (the size of the portion having an effective value in a masking filter) of the layer $\ell$, $c_{in}^\ell$ denotes the number of input channels in the layer $\ell$, and $c_{out}^\ell$ denotes the number of output channels in the layer $\ell$.

As described above, the neural network learning apparatus sets a condition for the weighed value so that the difference value between the output data and the target data may be converged, and may determine at least one of the number of optimized channels and the size of the portion having an effective value in the masking filter.

Figure 3:
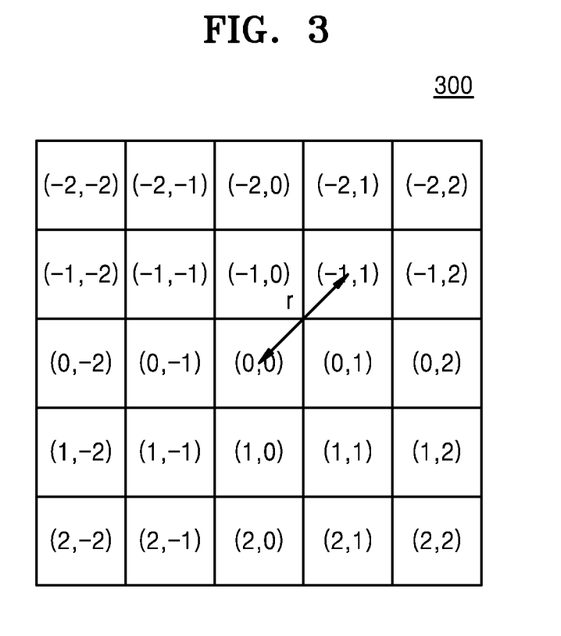
FIG. 3 is a diagram for describing a method, by a neural network learning apparatus according to an embodiment, of determining a size of a specific portion of a filter, having an effective value in a filter, as a distance.

FIG. 3 is a diagram for describing a method, by a neural network learning apparatus according to an embodiment, of determining a size of a specific portion having an effective value in a filter 300 as a distance r.

Referring to FIG. 3, the neural network learning apparatus may use a distance from a center of the filter 300 in order to determine the size of the filter 300 having a weighed value. Here, determining of the size of the filter 300 may denote determining of a size of a portion having an effective value in a masking filter applied to the filter 300, not a size of the filter 300 itself included in the learning network model.

The neural network learning apparatus determines the size of the portion having the effective value in the masking filter based on the distance from the center of the masking filter, and thus may set the loss function about the difference between the output data and the target data described above with reference FIG. 2 to have the distance from the center of the filter having the continuous value as a variable. The relationship between the size k of the filter and the distance r from the center may be determined based on equation 5 below.

$$k \triangleq \begin{cases} |r| - \underline{r} & \text{if } 0 \leq |r| < 1 \\ (2\underline{r} - 1) + (|r| - r), & \text{otherwise} \end{cases} \quad \text{[Equation 5]}$$

In equation 5 above, $\underline{r}$ denotes a descending value of the absolute value r. In equation 5 above, $(2\underline{r}-1)$ denotes an integer part of the filter size k, and $(|r|-r)$ denotes a decimal part of the filter size k.

Also, a size of the filter may be expressed by equation 6 below, based on the filter size k and the distance r from the center.

$$M_{r,s}(a,b) \triangleq \begin{cases} \frac{|s|}{\lfloor k \rfloor}, & \text{if } |a| < \underline{r}, |b| < \underline{r} \\ \frac{|s|}{\lfloor k \rfloor} \cdot D_r, & \text{if } |a| = \underline{r}, |b| = \underline{r} \\ 0, & \text{otherwise} \end{cases} \quad \text{[Equation 6]}$$

In equation 6 above, a and b denote spatial locations of a mask matrix, k may be expressed by $2\underline{r}-1$, and $D_r$ may be expressed by $|r|-\underline{r}$. Also, in equation 6 above, s denotes a scaling factor.

As a result of multiplying a weight matrix according to the embodiment by a mask determined according to equation 6 above, output data of a layer may be obtained based on equation 7 below.

$$y^\ell = [M_{r,s}^\ell \odot W^\ell] * x^\ell + b^\ell \quad \text{[Equation 7]}$$

In equation 7 above, $\odot$ denotes an element-wise multiplication operation, and * denotes a convolution operator. Also, in equation 7 above, $M_{r,s}^\ell$ denotes a mask specified according to a distance and a scaling factor of a layer, $x^\ell$ denotes an input vector of a layer $\ell$, $b^\ell$ denotes a bias vector of the layer $\ell$, and $W^\ell$ denotes a weight matrix of the layer $\ell$.

Equation 7 above may be differentiable according to radius $r_k$ and $r_c$ which respectively determine the filter size and the number of channels.

Figure 4:
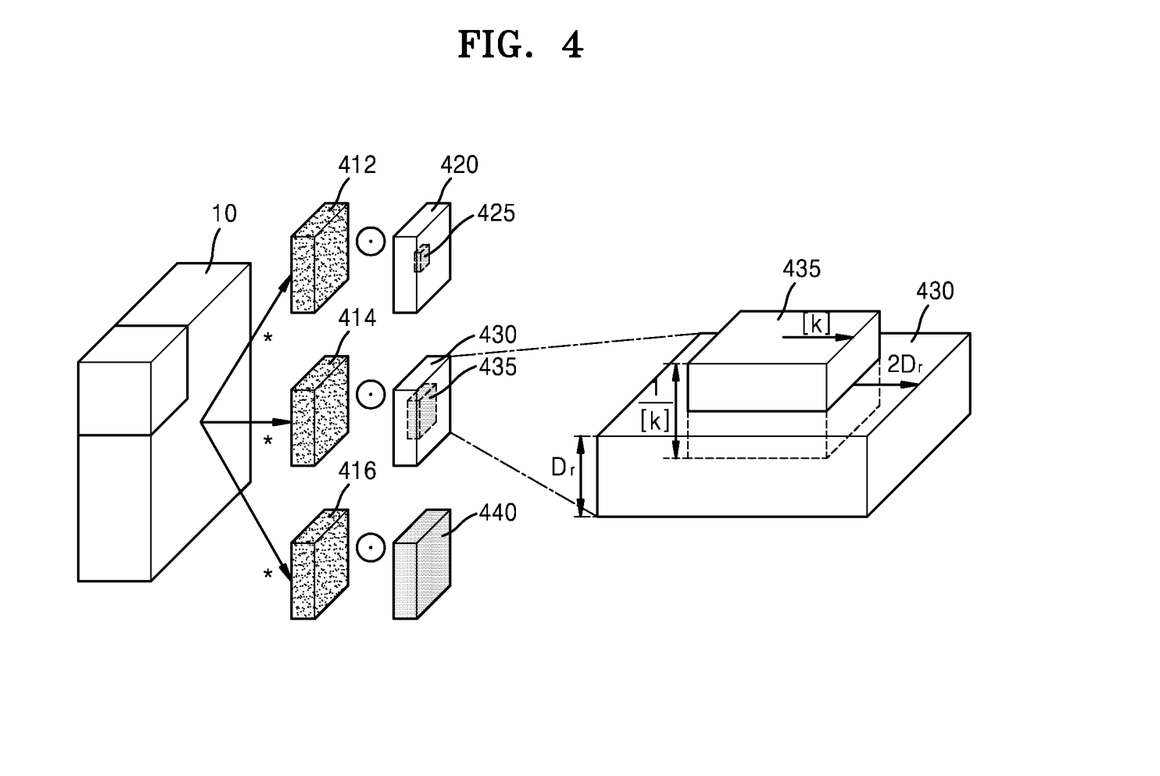
FIG. 4 is a diagram for describing a method of determining a size of a filter used to extract characteristics of input data by using a masking filter, in a neural network learning apparatus according to an embodiment.

FIG. 4 is a diagram for describing a method of determining a size of a filter used to extract characteristics of input data by using a masking filter, in a neural network learning apparatus according to an embodiment.

Referring to FIG. 4, a neural network learning apparatus may include a learning network model including an input layer, at least one hidden layer, and an output layer. The hidden layer may include a filter (for example, 412) including weighed values for extracting characteristics from input data. Also, the hidden layer may include a plurality of channels. Also, each of the channels included in the hidden layer may include filters 412, 414, and 416.

The neural network learning apparatus according to the embodiment may adjust a size of the filter (e.g., 414) by applying a masking filter (e.g., 420) having an effective value in a specific portion (e.g., 435) to the filter 414 included in the hidden layer.

For example, in the masking filter 430, the portion 435 having the effective value may pass the weighed value of the filter 416 corresponding thereto. Accordingly, the neural network learning apparatus may obtain an effect of changing the size of the filter 416 into the size of the portion 435 having the effective value in the masking filter 430. Other portions than the portion 435 having the effective value in the masking filter 430 may have a value of 0.

Also, the neural network according to the embodiment may determine a size of a portion having an effective value in a masking filter for each channel. According to another embodiment, the neural network may determine the number of optimized channels, in order to minimize a difference between output data and target data. In this case, a loss function, that is, information about the difference between the output data and the target data, may include the number of channels as a variable.

Figure 5:
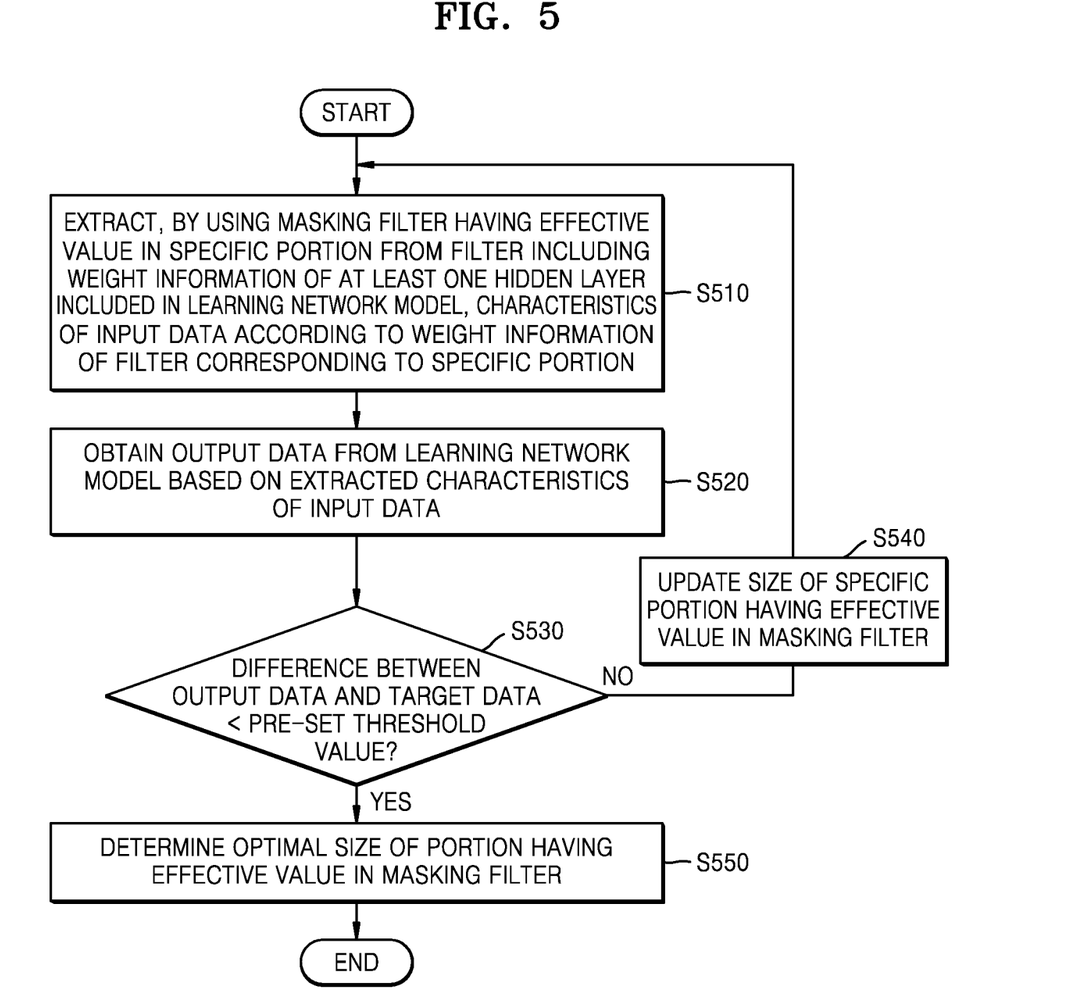
FIG. 5 is a flowchart illustrating a method, by a neural network learning apparatus according to an embodiment, of determining a size of a portion of a filter, having an effective value in a masking filter.

FIG. 5 is a flowchart illustrating a method, by a neural network learning apparatus according to an embodiment, of determining a size of a portion having an effective value in a masking filter.

In operation S510, the neural network learning apparatus may extract, by using a masking filter having an effective value in a specific portion from a filter including weight information of at least one hidden layer included in a learning network model, characteristics of input data according to weight information of the filter corresponding to the specific portion.

Operation S510 may correspond to operation S210 described above with reference to FIG. 2.

In operation S520, the neural network learning apparatus may obtain output data from the learning network model, based on the extracted characteristics of the input data.

In operation S530, the neural network learning apparatus may determine whether the difference between the output data and the target data is less than a pre-set threshold value.

The neural network learning apparatus according to the embodiment may represent information about the difference between the output data and the target data as a loss function. Here, the loss function may have variables regarding the number of channels included in the learning network model, a size of a filter for each channel, etc.

The neural network learning apparatus may determine the number of channels, the size of the filter for each channel, etc., for reducing the difference between the output data and the target data, based on a gradient descent technique.

In operation S540, the neural network learning apparatus may update the size of the specific portion having the effective value in the masking filter.

The neural network learning apparatus according to the embodiment may repeatedly perform operations of S510 to S540, when a difference obtained by comparing output data obtained after the update with the target data is not less than the pre-set threshold value.

In operation S550, the neural network learning apparatus may determine an optimal size of the portion having the effective value in the masking filter.

When the difference between the output data and the target data is less than the pre-set threshold value, the neural network learning apparatus according to the embodiment may determine that the number of channels set for the learning network model, the size of the certain portion having the effective value in the masking filter, etc. are set as optimized values, and may terminate the learning.

Figure 6:
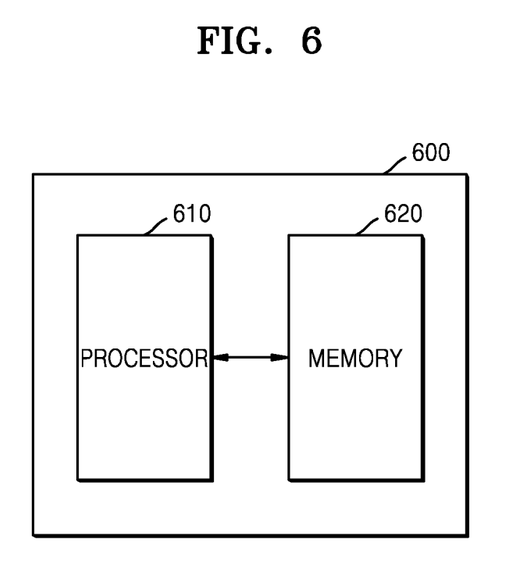
FIG. 6 is a block diagram of a neural network learning apparatus according to an embodiment.

FIG. 6 is a block diagram of a neural network learning apparatus 600 according to an embodiment.

Referring to FIG. 6, the neural network learning apparatus 600 may include a processor 610 and a memory 620.

The processor 610 may include one or more cores (not shown) and a connection path (e.g., bus, etc.) transmitting/receiving signals to/from a graphics processing unit (not shown) and/or other elements.

According to the embodiment, the processor 610 may execute the operations of the neural network learning apparatus 600 described above with reference to FIGS. 1 to 5.

For example, the processor 610 may extract, by using a masking filter having an effective value in a specific portion from a filter including weight information of at least one hidden layer included in a learning network model, characteristics of input data according to weight information of the filter corresponding to the specific portion. Also, the processor 610 may compare output data obtained from the learning network model with the target data, based on the extracted characteristic of the input data. The processor 610 may update the size of the certain portion having the effective value in the masking filter, based on a comparison result between the output data and the target data.

The processor 610 according to the embodiment may repeatedly perform the operation of updating the size of the certain portion having the effective value in the masking filter, until the difference between the output data and the target data is less than the pre-set threshold value, based on the gradient descent technique.

In addition, the information about the difference between the output data and the target data may include a function having a size of a specific portion of a filter as a variable. Also, the size of the specific portion of the filter may be determined according to a distance from a center of the masking filter.

The processor 610 according to the embodiment may extract characteristics of the input data by using the masking filter from the filter including weight information of at least one hidden layer in each of the certain number of channels that are included in the learning network model. The processor 610 may update the number of channels and the size of the specific portion having the effective value in the masking filter for each channel, based on a comparison result between output data obtained based on the extracted characteristics and the target data.

In addition, the processor 610 may further include a random access memory (RAM, not shown) and a read only memory (ROM, not shown) that temporarily and/or permanently store signals (or data) processed in the processor 610. Also, the processor 610 may be implemented as a system on chip (SoC) including at least one of a graphic processor, a RAM, and a ROM.

The memory 620 may store programs (one or more instructions) for processing and controlling the processor 610. The programs stored in the memory 620 may be classified as a plurality of modules according to functions thereof. According to the embodiment, the memory 620 may be configured with a data learning unit and a data recognition unit as software modules, wherein the data learning unit and the data recognition unit will be described later with reference to FIG. 13. Also, the data learning unit and the data recognition unit may each include a learning network model, or may share one learning network model.

Figure 7:
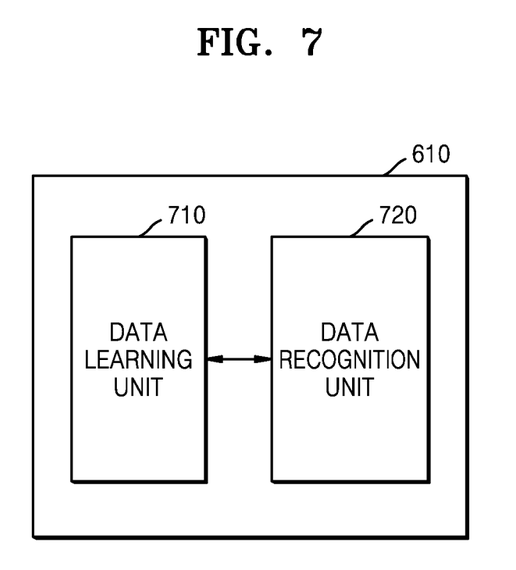
FIG. 7 is a diagram illustrating a processor according to an embodiment.

FIG. 7 is a diagram illustrating the processor 610 according to an embodiment.

Referring to FIG. 7, the processor 610 according to the embodiment may include a data learning unit 710 and a data recognition unit 720.

The data learning unit 710 may learn a criterion for extracting characteristics of input data. For example, the data learning unit 710 may learn a criterion for extracting at least one piece of characteristic information from an input image. Here, according to the trained criterion, a weighed value of at least one layer included in the data learning unit 710 may be determined.

The data recognition unit 720 may extract characteristic information of the input data or obtain output data based on extracted characteristic information, based on the criterion trained by the data learning unit 710. For example, the data recognition unit 720 may extract characteristic information from an input image or may obtain a result of recognizing a class of an object included in the input image as output data based on the extracted characteristic information.

At least one of the data learning unit 710 and the data recognition unit 720 may be manufactured in the form of at least one hardware chip that is mounted in the neural network learning apparatus. For example, at least one of the data learning unit 710 and the data recognition unit 720 may be manufactured as a hardware chip exclusive for artificial intelligence (AI), or may be manufactured as a part of an existing universal processor (e.g., a central processing unit (CPU) or an application processor) or a graphics-only processor (e.g., graphics processing unit (GPU)) to be mounted in the various neural network learning apparatuses.

In this case, the data learning unit 710 and the data recognition unit 720 may be mounted in one neural network learning apparatus, or may be respectively mounted in separate neural network learning apparatuses. For example, one of the data learning unit 710 and the data recognition unit 720 may be included in a device and the other may be included in a server. Also, the data learning unit 710 and the data recognition unit 720 may communicate with each other through wires or wirelessly, so that model information established by the data learning unit 710 may be provided to the data recognition unit 720 and data input to the data recognition unit 720 may be provided to the data learning unit 710 as additional training data.

In addition, at least one of the data learning unit 710 and the data recognition unit 720 may be implemented as a software module. When at least one of the data learning unit 710 and the data recognition unit 720 is implemented as a software module (or a programming module including instructions), the software module may be stored in a non-transitory computer-readable medium. In addition, in this case, the at least one software module may be provided by an operating system (OS), or a predetermined application. Otherwise, a part of the at least one software module is provided by the OS or the remaining part of the at least one software module may be provided by a predetermined application.

Figure 8:
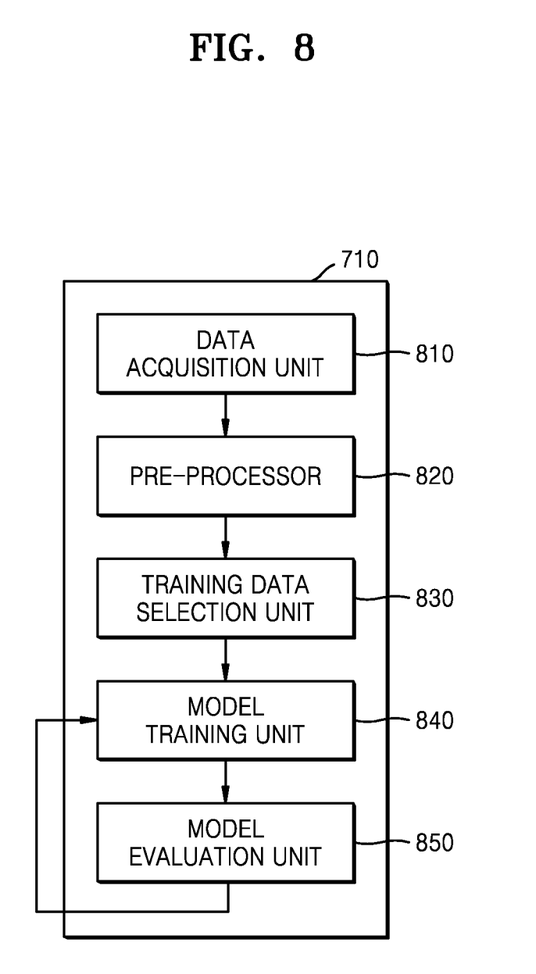
FIG. 8 is a block diagram of a data learning unit according to an embodiment.

FIG. 8 is a block diagram of the data learning unit 710 according to the embodiment.

Referring to FIG. 8, the data learning unit 710 according to some embodiments may include a data acquisition unit 810, a pre-processor 820, a training data selection unit 830, a model training unit 840, and a model evaluation unit 850. However, one or more embodiments are not limited thereto, that is, the data learning unit 710 may include less or more elements than the above-stated elements.

The data acquisition unit 810 may obtain images, etc. as input data. For example, the data acquisition unit 810 may obtain at least one image from the neural network learning apparatus including the data learning unit 710 or an external device or server being capable of communicating with the neural network learning apparatus including the data learning unit 710.

Also, the data acquisition unit 810 may obtain output data such as a result of recognizing a class of an object included in an image, by using the learning network model described above with reference to FIGS. 1 to 4.

In addition, at least one input image acquired by the data acquisition unit 810 according to the embodiment may be one of images classified according to classes thereof. For example, the data acquisition unit 810 may execute learning based on images classified according to kinds.

The pre-processor 820 may pre-process the obtained image, so that the obtained image may be used in learning to extract characteristic information of the image or to recognize class of an object in the image. The pre-processor 820 may process the at least one obtained image in a preset format, so that the model training unit 840 that will be described later may use the at least one image obtained for learning.

The training data selection unit 830 may select an image necessary for the learning, from the pre-processed data. The selected image may be provided to the model training unit 840. The training data selection unit 830 may select an image necessary for learning from among the pre-processed images, according to a set criterion.

The model training unit 840 may learn a criterion for information that is used to obtain characteristic information or to recognize an object in an image, from images in a plurality of layers of the learning network model. For example, the model training unit 840 may learn the size of the filter, the number of channels, etc. for reducing the difference between the output data and the target data.

According to one or more embodiments, when there are a plurality of data recognition models established in advance, the model training unit 840 may determine a data recognition model, in which input training data and basic training data are highly related to each other, as the data recognition model to learn. In this case, the basic training data may be classified in advance according to data types, and the data recognition model may be established in advance for each data type. For example, the basic training data may be classified in advance based various criteria such as a region where the training data is generated, a time of generating the training data, a size of the training data, genre of the training data, a producer of the training data, kinds of objects included in the training data, etc.

Also, the model training unit 840 may train the data recognition model through, for example, reinforcement learning which uses feedback as to whether the class recognized according to the training is correct.

Also, when the data recognition model is trained, the model training unit 840 may store the trained data recognition model. In this case, the model training unit 840 may store the trained data recognition unit in a memory of the neural network learning apparatus including the data acquisition unit 810. Alternatively, the model training unit 840 may store the trained data recognition unit in a memory of a server that is connected to the neural network learning apparatus through a wired network or a wireless network.

In this case, the memory storing the trained data recognition model may also store, for example, commands or data related to at least one another element of the neural network learning apparatus. Also, the memory may store software and/or programs. The program may include, for example, a kernel, middleware, an application programming interface (API), and/or an application program (or "application"), etc.

The model evaluation unit 850 may input evaluation data to the data recognition model, and when a result of generating additional training data output from the evaluation data does not satisfy a predetermined criterion, the model evaluation unit 850 may train the model training unit 840 again. For example, as a result of determination based on the loss function representing information about the difference between the output data and the target data, when the difference between the output data and the target data is equal to or greater than a threshold value, the model evaluation unit 850 may re-determine the number of channels, the size of the filter, etc. in the model training unit 840. In this case, the evaluation data may be set in advance to evaluate the data recognition model.

In addition, when there are a plurality of learning network models, the model evaluation unit 850 evaluates whether the predetermined criterion is satisfied with respect to each of the learning network models and may determine the model satisfying the predetermined standard as a final learning network model.

At least one of the data acquisition unit 810, the pre-processor 820, the training data selection unit 830, the model training unit 840, and the model evaluation unit 850 in the data learning unit 710 may be manufactured as at least one hardware chip and mounted in the neural network learning apparatus. For example, at least one of the data acquisition unit 810, the pre-processor 820, the training data selection unit 830, the model training unit 840, and the model evaluation unit 850 may be manufactured as a hardware chip exclusive for the AI, or may be manufactured as a part of an existing universal processor (e.g., CPU or application processor) or a graphics-only processor (e.g., CPU) to be mounted in various neural network learning apparatuses described above.

Also, the data acquisition unit 810, the pre-processor 820, the training data selection unit 830, the model training unit 840, and the model evaluation unit 850 may be provided in one neural network learning apparatus, or may be respectively provided in separate neural network learning apparatuses. For example, some of the data acquisition unit 810, the pre-processor 820, the training data selection unit 830, the model training unit 840, and the model evaluation unit 850 may be included in the neural network learning apparatus, and some other may be included in a server.

Also, at least one of the data acquisition unit 810, the pre-processor 820, the training data selection unit 830, the model training unit 840, and the model evaluation unit 850 may be implemented as a software module. When at least one of the data acquisition unit 810, the pre-processor 820, the training data selection unit 830, the model training unit 840, and the model evaluation unit 850 is implemented as a software module (or a program module including instructions), the software module may be stored in a non-transitory computer-readable medium. In addition, in this case, the at least one software module may be provided by an operating system (OS), or a predetermined application. Otherwise, a part of the at least one software module is provided by the OS or the remaining part of the at least one software module may be provided by a predetermined application.

Figure 9:
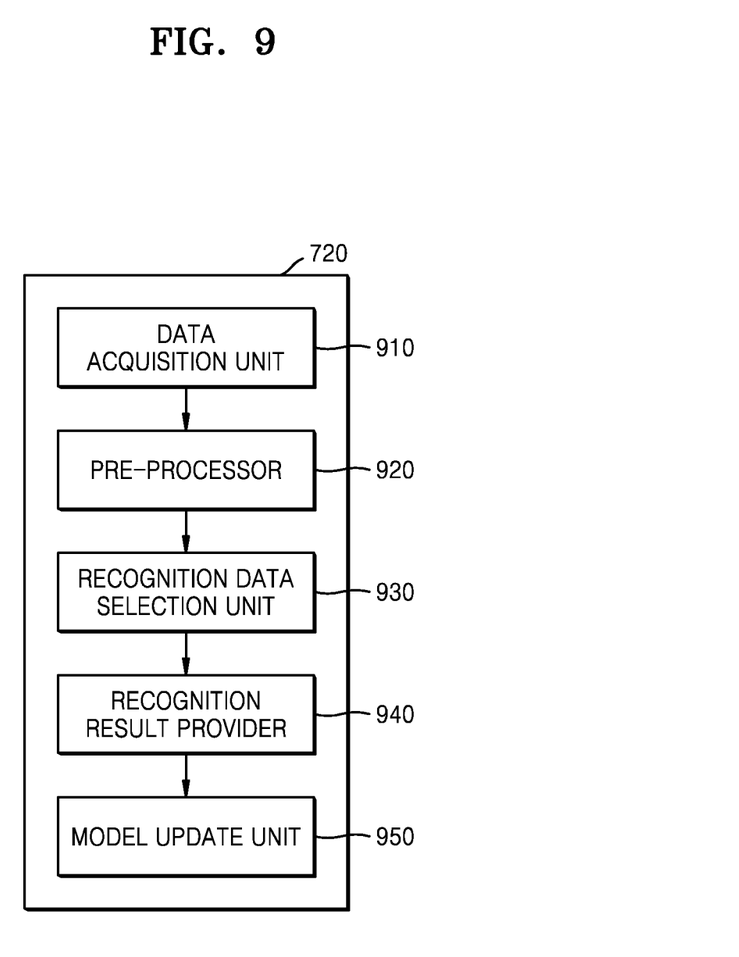
FIG. 9 is a block diagram of a data recognition unit according to an embodiment.

FIG. 9 is a block diagram of the data recognition unit 720 according to an embodiment.

Referring to FIG. 9, the data recognition unit 720 according to some embodiments may include a data acquisition unit 910, a pre-processor 920, a recognition data selection unit 930, a recognition result provider 940, and a model update unit 950.

The data acquisition unit 910 may obtain at least one piece of input data, and the pre-processor 920 may pre-process the obtained input data so that at least one piece of input data may be used to extract characteristic information of the input data or to obtain output data. Here, when the input data is of an image format, the output data may include a result of recognizing an object included in the image. However, the output data is not limited to the above example.

The pre-processor 920 may process the obtained image in a pre-set format, so that the recognition result provider 940 that will be described below may use the obtained image for extracting characteristic information of the image or for recognizing a class of an object in the image. The recognition data selection unit 930 may select an image that is necessary for extracting characteristics or for recognizing the class, from the pre-processed data. Selected data may be provided to the recognition result provider 940.

The recognition result provider 940 may apply the selected data to a learning network model according to the embodiment, in order to extract characteristic information or to obtain output data. For example, the recognition result provider 940 may recognize an object in a selected image, when the selected image is input thereto.

The recognition result provider 940 may provide a result of recognizing a class of the object included in at least one image.

The model update unit 950 may provide the model training unit 840 described above with reference to FIG. 8 with information about evaluation so that a parameter of a classification network or at least one characteristic extracting layer included in the learning network model, a size of a filter, the number of channels, etc., based on evaluation about output data provided from the recognition result providing unit 940.

In addition, at least one of the data acquisition unit 910, the pre-processor 920, the recognition data selection unit 930, the recognition result provider 940, and the model update unit 950 in the data recognition unit 720 may be manufactured as at least one hardware chip and mounted in the neural network learning apparatus. For example, at least one of the data acquisition unit 910, the pre-processor 920, the recognition data selection unit 930, the recognition result provider 940, and the model update unit 950 may be manufactured as a hardware chip exclusive for AI, or may be manufactured as a part of an existing universal processor (e.g., a CPU or an application processor) or a graphics-only processor (e.g., GPU) to be mounted in the various neural network learning apparatuses.

Also, the data acquisition unit 910, the pre-processor 920, the recognition data selection unit 930, the recognition result provider 940, and the model update unit 950 may be provided in one neural network learning apparatus, or may be respectively provided in separate neural network learning apparatuses. For example, some of the data acquisition unit 910, the pre-processor 920, the recognition data selection unit 930, the recognition result provider 940, and the model update unit 950 may be included in the neural network learning apparatus, and some other may be included in a server.

Also, at least one of the data acquisition unit 910, the pre-processor 920, the recognition data selection unit 930, the recognition result provider 940, and the model update unit 950 may be implemented as a software module. When at least one of the data acquisition unit 910, the pre-processor 920, the recognition data selection unit 930, the recognition result provider 940, and the model update unit 950 is implemented as a software module (or a program module including instructions), the software module may be stored in a non-transitory computer-readable medium. In addition, in this case, the at least one software module may be provided by an operating system (OS), or a predetermined application. Otherwise, a part of the at least one software module is provided by the OS or the remaining part of the at least one software module may be provided by a predetermined application.

The embodiments of the disclosure can be written as computer programs and can be implemented in general-use digital computers that execute the programs using a computer readable recording medium.

Examples of the computer readable recording medium include magnetic storage media (e.g., ROM, floppy disks, hard disks, etc.), optical recording media (e.g., CD-ROMs, or DVDs), and carrier waves (e.g., transfer through Internet), etc.

While the present disclosure has been particularly illustrated and described with reference to exemplary embodiments thereof, it will be understood by those of ordinary skill in the art that various changes in form and details may be made therein without departing from the spirit and scope of the present disclosure. Thus, the embodiments set forth herein or shown above are to be interpreted in an illustrative and non-limiting sense.

What is claimed is:

1. A neural network learning method performed by a neural network learning apparatus, the method comprising:
   extracting, by using a masking filter having an effective value in a specific portion of the masking filter comprising weight information of at least one hidden layer included in a learning network model, characteristics of input data according to weight information of a filter corresponding to the specific portion;
   comparing output data with target data, the output data being obtained from the learning network model based on the extracted characteristics of the input data; and
   updating a size of the specific portion having the effective value in the masking filter, based on a result of the comparing,
   wherein the size of the specific portion of the filter is determined according to a distance from a center of the masking filter.

2. The neural network learning method of claim 1, wherein the updating of the size of the specific portion having the effective value in the masking filter is repeatedly performed, based on a gradient descent technique, until a difference between the output data and the target data is less than a pre-set threshold value.

3. The neural network learning method of claim 1, wherein information about the difference between the output data and the target data comprises a function having the size of the specific portion in the filter as a variable, the information being obtained as the result of the comparing.

4. The neural network learning method of claim 1, wherein the extracting of the characteristics of the input data comprises extracting the characteristics of the input data by using the masking filter from a filter comprising weight information of at least one hidden layer in each of a certain number of channels that are included in the learning network model, and
   the updating of the size comprises updating the number of the channels and the size of the specific portion having the effective value in the masking filter with respect to each of the certain number of channels, based on the result of the comparing.

5. A neural network learning apparatus comprising:
   a memory storing one or more instructions; and
   at least one processor configured to execute the one or more instructions stored in the memory,
   wherein the at least one processor is further configured to:
      extract, by using a masking filter having an effective value in a specific portion of the masking filter comprising weight information of at least one hidden layer included in a learning network model, characteristics of input data according to weight information of a filter corresponding to the specific portion,
      compare output data with target data, the output data being obtained from the learning network model based on the extracted characteristics of the input data, and
      update a size of the specific portion having the effective value in the masking filter, based on a result of the comparing,
   wherein the size of the specific portion of the filter is determined according to a distance from a center of the masking filter.

6. The neural network learning apparatus of claim 5, wherein the at least one processor is further configured to repeatedly update the size of the specific portion having the effective value in the masking filter until the difference between the output data and the target data is less than a pre-set threshold value.

7. The neural network learning apparatus of claim 5, wherein the at least one processor is further configured to obtain information about the difference between the output data and the target data based on the result of the comparing, and
   the information about the difference comprises a function having the size of the specific portion in the filter as a variable.

8. The neural network learning apparatus of claim 5, wherein the at least one processor is further configured to:
   extract the characteristics of the input data by using the masking filter from a filter comprising weight information of at least one hidden layer in each of a certain number of channels that are included in the learning network model, and
   update the number of the channels and the size of the specific portion having the effective value in the masking filter with respect to each of the certain number of channels, based on the result of the comparing.

9. A non-transitory computer-readable recording medium having recorded thereon a program which, when executed by a computer, causes the computer to perform operations comprising:
   extracting, by using a masking filter having an effective value in a specific portion of the making filter comprising weight information of at least one hidden layer included in a learning network model, characteristics of input data according to weight information of a filter corresponding to the specific portion;
   comparing output data with target data, the output data being obtained from the learning network model based on the extracted characteristics of the input data; and
   updating a size of the specific portion having the effective value in the masking filter, based on a result of the comparing,
   wherein the size of the specific portion of the filter is determined according to a distance from a center of the masking filter.

* * * * *